May 26, 1959   G. B. BANKS   2,888,601
TELEVISION AND LIKE CAMERA TUBE ARRANGEMENTS
Filed Feb. 11, 1955

Inventor:
George Baldwin Banks
By his attorneys:
Baldwin & Wight

United States Patent Office 2,888,601
Patented May 26, 1959

2,888,601

TELEVISION AND LIKE CAMERA TUBE ARRANGEMENTS

George Baldwin Banks, Chelmsford, England, assignor to English Electric Valve Company Limited, London, England, a British company Application February 11, 1955, Serial No. 487,638

Claims priority, application Great Britain April 29, 1954

1 Claim. (Cl. 315—11)

This invention relates to television and like camera tube arrangements, and more specifically to such arrangements including a camera tube of the kind wherein an optical image of a scene to be transmitted is projected on to a photo-electric cathode, the electrons from which are directed on to a secondary emitting target structure to produce an electric charge image thereon, said charge image being scanned by an electron beam, to develop picture signals for transmission. A commonly employed tube of this kind is the well konwn "Image Orthicon."

Camera tube arrangements as at present known, and employing camera tubes of the kind referred to, have the disadvantage of "black halo" effect, i.e. pictures reproduced from picture signals, developed by such tubes exhibit more or less dark areas, the so-called "black halos," around high lights in the picture. The disadvantage is obviously objectionable and the object of the present invention is substantially to reduce or eliminate this defect.

For a better understanding of the invention and to show how the same may be carried into effect reference will now be made to the accompanying drawings in which:

Fig. 1 illustrates a known tube of the kind referred to; and

Figure 1:
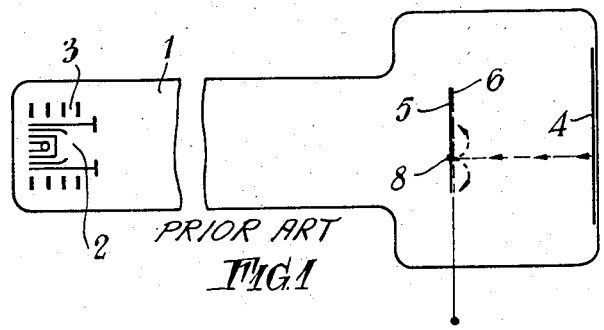

Referring to Fig. 1, the tube therein shown is an Image Orthicon tube of known form. The tube comprises within the usual envelope 1, an electron gun structure generally designated 2, centrally situated within an electron multiplying and picture signal output electrode system 3 of customary form and conventionally indicated. The tube envelope has a comparatively narrow elongated neck in which is the scanning section of the tube and an enlarged or bulbous end in which is the image section of the tube. The image section comprises a semi-transparent photo-electric cathode 4, deposited upon the inner side of the end wall of the enlarged end of the tube and a target structure consisting of a target proper 5 and a target screen 6. In use, the target screen would be maintained at about 500 volts positive with respect to the photo-electric cathode.

When an ordinary Image Orthicon such as is shown in Fig. 1 is in use, photo electrons are released from different parts of the photo-electric cathode in direct proportion to the brightness of the corresponding parts of an optical image projected thereon. These electrons are accelerated towards the target structure by a uniform electric field and focussed on to the target by a uniform magnetic field parallel to the axis and generated by a focussing coil (not shown). The photo electrons strike the target at a velocity determined by its potential, the velocity being such that the secondary emission ratio at the target is greater than unity. Because more secondary electrons are emitted from the target than there are incident primary electrons thereon, a positive charge image is formed on the said target, brighter parts of the original scene producing more positive areas in the positive charge image. The secondaries are collected by the fine mesh target screen. Simultaneously with the formation of the charge image on one side of the target a beam of electrons scans the opposite side with low velocity electrons. As the scanning beam electrons approach the target they are decelerated towards zero volts and, if there is no positive charge on the target where a scanning beam electron reaches it, said electron returns towards the gun, the electron being received and multiplied by the secondary electron multiplier around the gun and produces an output signal. Where, however, there are posiitve charges on the target, the beam electrons are deposited in sufficient numbers to neutralize the positive charges and only the remaining electrons are reflected. In consequence the electron multiplied output signal from the final electrode of the electrode system 3 around the gun will be an amplitude modulated signal of instantaneous amplitude representative of the positive charge image on the target which, in turn, is representative of the original optical scene.

Suppose now, that the original scene contains strong high lights. Then, in practice, the charge deposited on the target during a "frame" period of scanning will be greater than the target can store and a state of equilibrium is set up in the target structure. In these circumstances the areas of the target corresponding to such high lights cannot gain or lose electrons, and secondary electrons, in excess of the number required to maintain a balance of charge, return through the target screen and shower on to areas of the target surrounding the said high light areas thus depressing the potential. This is indicated schematically in Fig. 1 in which the spot 8 on the target is intended to represent a high light area and the arrow headed dotted lines are intended to represent typical paths of primary electrons reaching the spot from the photo cathode and of secondary electrons acting as just described. In consequence the "black halo" effect is produced, the darkened areas occurring where the secondary electrons return to the target round the high light areas.

According to this invention there is provided a camera tube arrangement employing a camera tube of the kind referred to, wherein the tube is provided with an additional electrode located between the target structure and the photo electric cathode of the tube, the additional electrode being maintained at a positive potential relative to the target structure potential, and adapted to collect secondary electrons emitted from the target structure so as to prevent them from returning to the target structure.

Figure 2:
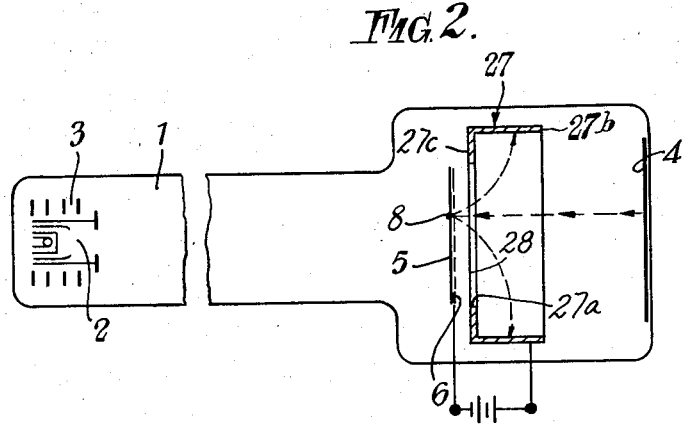
Fig. 2 shows schematically one embodiment of the present invention.

Referring now to Fig. 2, and comparing it with Fig. 1, it will be seen that the difference between the two tubes is that in the tube of Fig. 2 (like references denote like parts in both figures) there is provided an additional electrode 27 for the collection of secondary electrons which would otherwise return to the target structure and cause "black halo" effect. Typical paths of primary electrons and of secondary electrons returning to electrode 27 are indicated by arrow headed dotted lines. In the example illustrated in Fig. 2, the electrode 27 has a grid or mesh 27a extending across the enlarged end of the tube between the target structure and the photo cathode. It should be so positioned as not itself to produce any appreciable "shadow effect" on the target structure and for that reason, in the illustrated tube, it is set well back from the target structure towards the photo cathode.

The electrode 27 is cup shaped with a hole or aperture 27a covered by a mesh 28 in the bottom having a diameter substantially equal to the diameter of said target structure 6 to pass the photo-electrons from the photo cathode to the target structure. The cup-shaped electrode 27 includes an annular bottom portion 27c in which the aperture 27a is located and a peripheral or cylindrical rim 27b connected with the annular bottom portion 27c and directed toward the photo-electric cathode 4 as shown in Fig. 2. The bottom portion 27c, the aperture 27a and the mesh 28 are all substantially coplanar. The target structure 6 and the aperture 27a are of substantially the same diameter and conform with each other.

In experimental practice with a tube as illustrated in Fig. 2 it has been found that satisfactory results and a virtually complete elimination of "black halo" effects are obtainable when the potential of the electrode 27 is about 30 to 60 volts positive with relation to the potential of the target screen 6, so that suitable operating potentials (in relation to the photo cathode potential) are +500 volts on the target screen and +530 to 560 volts on the electrode 27. The actual relative potential to be employed between the additional electrode 27 and the target screen 6 will, of course, depend in each particular case on the position and configuration of the said additional electrode 27 and the general geometry of the tube.

I claim:

A camera tube circuit arrangement employing a camera tube having at least a photo-electric cathode for emitting photo-electrons, a target structure comprising a target proper and a closely spaced target screen electrode arranged parallel thereto on the same side of said target proper as said cathode, and a separate additional electrode disposed between said target screen electrode and said cathode, said camera tube geing of the kind wherein positive charges are developed on said target proper due to secondary electron emission therefrom, in accordance with an optical image on said cathode, said additional electrode being arranged parallel to said target structure and being maintained at such a potential positive with respect to said target structure as to collect secondary electrons emitted from said target structure, the operating potentials throughout such arrangement being such that the passage of photo-electrons from said cathode to said target structure is substantially unaffected by said additional electrode, and wherein the additional electrode is of cup-shape, there being an aperture in the bottom of a size substantially conforming with the diameter of said target structure and covered by a mesh so as to permit photo-electrons from the photo-electric cathode of the tube to pass therethrough to the target structure, said additional electrode including an annular portion substantially coplanar with the bottom electrode and a cylindrical rim contiguous with the bottom thereof and directed toward said photo-electric cathode.

References Cited in the file of this patent

UNITED STATES PATENTS

| | | |
|---|---|---|
| 2,214,973 | Rose | Sept. 17, 1940 |
| 2,244,466 | Lubszynski et al. | June 3, 1941 |
| 2,652,515 | McGee | Sept. 15, 1953 |
| 2,723,360 | Rotow | Nov. 8, 1955 |
| 2,777,970 | Weimer | Jan. 15, 1957 |